(12) United States Patent
Kimoto (10) Patent No.: US 10,381,912 B2
(45) Date of Patent: Aug. 13, 2019

(54) MAGNETIC TRANSMISSION

(71) Applicant: Hitachi Metals, Ltd., Tokyo (JP)

(72) Inventor: Akihiro Kimoto, Suita (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 15/762,976

(22) PCT Filed: Nov. 22, 2016

(86) PCT No.: PCT/JP2016/084557
§ 371 (c)(1),
(2) Date: Mar. 23, 2018

(87) PCT Pub. No.: WO2017/104359
PCT Pub. Date: Jun. 22, 2017

(65) Prior Publication Data
US 2018/0278139 A1    Sep. 27, 2018

(30) Foreign Application Priority Data

Dec. 17, 2015 (JP) .................................. 2015-246623

(51) Int. Cl.
*F16H 49/00* (2006.01)
*H02K 49/10* (2006.01)
(Continued)

(52) U.S. Cl.
CPC ........... *H02K 49/102* (2013.01); *F16H 49/00* (2013.01); *H02K 11/215* (2016.01);
(Continued)

(58) Field of Classification Search
CPC ...... H02K 49/00; H02K 49/10; H02K 49/102; H02K 49/106; F16H 49/00; F16H 49/005
(Continued)

(56) References Cited

U.S. PATENT DOCUMENTS 6,263,664 B1    7/2001  Tanigawa et al.
2012/0291575 A1* 11/2012 Edwards .............. H02K 49/102
                                                    74/325

(Continued)

FOREIGN PATENT DOCUMENTS

JP    H10-073155 A    3/1998
JP    2011-094742 A    5/2011
JP    2015-143515 A    8/2015

OTHER PUBLICATIONS

English Translation of International Search Report for PCT/JP2016/084557 dated Feb. 21, 2017, 1 page.

*Primary Examiner* — Quyen P Leung
*Assistant Examiner* — Minki Chang
(74) *Attorney, Agent, or Firm* — Bret E. Field; Bozicevic, Field & Francis LLP (57) ABSTRACT

A magnetic transmission is provided with: an inner rotor; an outer rotor; and a magnetic-field-modulating stator disposed coaxially between the inner rotor and the outer rotor. The inner rotor is provided with a first magnet array and a second magnet array arranged in the direction of the central axis and disposed at different pitches along the circumferential direction. The outer rotor is provided with a magnet array disposed along the circumferential direction. The magnetic-field-modulating stator is provided with a first magnetic body array and a second magnetic body array opposing the first magnet array and the second magnet array, respectively. Further, by moving the inner rotor and the magnetic-field-modulating stator in the direction of the central axis while holding the opposing relationship between the first magnetic body array and the second magnetic body array, and the first magnet array and the second magnet array, the position where the outer rotor, and the first magnet array and the second magnet array oppose each other is changed continuously.

5 Claims, 6 Drawing Sheets

(51) Int. Cl.
*H02K 11/215* (2016.01)
*H02K 21/02* (2006.01)

(52) U.S. Cl.
CPC ......... *H02K 49/106* (2013.01); *H02K 21/024* (2013.01); *H02K 2213/09* (2013.01)

(58) Field of Classification Search
USPC .......................... 310/92, 103, 105, 108, 109
See application file for complete search history.

(56) References Cited

U.S. PATENT DOCUMENTS

| | | | | |
|---|---|---|---|---|
| 2013/0113317 A1* | 5/2013 | Englert | ................ | H02K 49/106 310/103 |
| 2015/0069872 A1* | 3/2015 | Zhu | ...................... | H02K 49/043 310/105 |
| 2017/0271971 A1* | 9/2017 | Riemay | ................ | H02K 49/102 |

* cited by examiner

MAGNETIC TRANSMISSION

CROSS-REFERENCE TO RELATED APPLICATIONS

This application is the national phase under 35 U.S.C. § 371 of PCT International Application No. PCT/JP2016/084557 which has an International filing date of Nov. 22, 2016 and designated the United States of America.

FIELD

The present invention relates to a radial gap type magnetic transmission the transmission gear ratio of which can be changed continuously.

BACKGROUND

Japanese Patent Application Laid-Open No. 2011-94742 discloses a radial gap type multistage magnetic transmission mechanism the transmission gear ratio of which can be switched discontinuously. The multistage magnetic transmission mechanism is provided with: a plurality of discoid inner rotors separately disposed in the direction of the rotation axis; a plurality of annular outer rotors disposed on the outer periphery side of the inner rotors, respectively; and an annular stator disposed between the inner rotors and the outer rotors. The inner rotors are provided on the input shaft, and on the plurality of inner rotors, a different number of magnetic pole pairs are disposed in the circumferential direction. The outer rotors are provided on the output shaft, and on the plurality of outer rotors, a different number of magnetic pole pairs are disposed in the circumferential direction. The magnetic pole pairs of the plurality of outer rotors and the magnetic pole pairs of the plurality of inner rotors oppose each other. On the stator, a plurality of magnetic bodies are disposed, and the magnetic bodies are structured so as to be capable of selectively opposing one of the pairs of the opposing inner rotors and outer rotors.

The multistage magnetic transmission mechanism is capable of discontinuously switching the transmission gear ratio by moving the stator in the direction of the rotation axis.

Specifically, the stator is moved to between the inner rotor and the outer rotor constituting a first pair and the magnetic bodies are opposed to the magnet arrays, whereby one transmission portion having a first transmission gear ratio is structured. The stator is moved to between the inner rotor and the outer rotor constituting a second pair and the magnetic bodies are opposed to the magnet arrays, whereby one transmission portion having a second transmission gear ratio is structured.

SUMMARY

However, the multistage magnetic transmission mechanism according to Japanese Patent Application Laid-Open No. 2011-94742 has a problem in that the transmission gear ratio cannot be changed continuously although the transmission gear ratio can be changed discontinuously. This is because it is considered that in order to realize a predetermined transmission gear ratio, the number of magnetic pole pairs constituting the inner rotors and the outer rotors and the number of magnetic bodies constituting the stator necessarily have a fixed relationship and the plurality of inner rotors and outer rotors are separated in the direction of the rotation axis.

It is an object to provide a radial gap type magnetic transmission the transmission gear ratio of which can be changed continuously.

A magnetic transmission according to the present disclosure comprises: an inner magnet array where a plurality of magnetic pole pairs are disposed at substantially equal intervals along a circumferential direction; an outer magnet array where a plurality of magnetic pole pairs are disposed along the circumferential direction coaxially with the inner magnet array at different pitches from the magnetic pole pairs of the inner magnet array; and a magnetic body array coaxially disposed between the inner magnet array and the outer magnet array and where a plurality of magnetic bodies are disposed along the circumferential direction, wherein the inner magnet array or the outer magnet array is provided with a first magnet array and a second magnet array arranged in a direction of a central axis and disposed at different pitches in the circumferential direction, the magnetic body array is provided with a first magnetic body array and a second magnetic body array opposing the first magnet array and the second magnet array in a radial direction, respectively, and disposed at different pitches in the circumferential direction, and the inner magnet array, the outer magnet array and the magnetic body array are relatively and continuously movable in the direction of the central axis while an opposing relationship is held between the first magnetic body array and the second magnetic body array, and the first magnet array and the second magnet array.

In the present disclosure, the magnetic transmission structures a radial gap type magnetic gear mechanism coaxially provided with the inner magnet array, the magnetic body array and the outer magnet array that are disposed coaxially. In a first mode, the inner magnet array is provided with the first magnet array and the second magnet array arranged in the direction of the central axis, and the magnetic body array is provided with the first magnetic body array and the second magnetic body array opposing the first magnet array and the second magnet array, respectively. The inner magnet array and the magnetic body array, and the outer magnet array can be relatively moved while the positional relationship between the inner magnet array and the magnetic body array is held, and the positional relationship between the inner magnet array and the outer magnet array can be changed continuously.

For example, by opposing the outer magnet array only to the first magnet array via the magnetic body array, a first transmission gear ratio can be realized. Moreover, by opposing the outer magnet array only to the second magnet array via the magnetic body array, a second transmission gear ratio can be realized. Further, by opposing the outer magnet array to both the first magnet array and the second magnet array via the magnetic body array, a transmission gear ratio intermediate between the first transmission gear ratio and the second transmission gear ratio can be realized.

In a second mode, the outer magnet array is provided with the first magnet array and the second magnet array arranged in the direction of the central axis, and the magnetic body array is provided with the first magnetic body array and the second magnetic body array opposing to the first magnet array and the second magnet array, respectively. The outer magnet array and the magnetic body array, and the inner magnet array can be relatively moved while the positional relationship between the outer magnet array and the magnetic body array is held, so that the positional relationship between the inner magnet array and the outer magnetic body array can be changed continuously. Consequently, the transmission gear ratio of the magnetic transmission can be changed continuously.

In the magnetic transmission according to the present disclosure, the first magnet array and the second magnet array are in contact in the direction of the central axis.

In the present disclosure, since the first magnet array and the second magnet array are in contact in the direction of the central axis, the transmission gear ratio can be changed more smoothly.

In the magnetic transmission according to the present disclosure, the first magnetic body array and the second magnetic body array are in contact in the direction of the central axis.

In the present disclosure, since the first magnetic body array and the second magnetic body array are in contact in the direction of the central axis, the transmission gear ratio can be changed more smoothly.

The magnetic transmission according to the present disclosure comprises: an actuator that relatively and continuously moves the inner magnet array, the outer magnet array and the magnetic body array in the direction of the central axis while the opposing relationship is held between the first magnetic body array and the second magnetic body array, and the first magnet array and the second magnet array.

In the present disclosure, the transmission gear ratio can be easily set since the actuator is provided that relatively and continuously moves the inner magnet array, the outer magnet array and the magnetic body array in the direction of the central axis while holding the opposing relationship between the first magnetic body array and the second magnetic body array, and the first magnet array and the second magnet array.

In the magnetic transmission according to the present disclosure, any two of the inner magnet array, the outer magnet array and the magnetic body array are rotatable in the circumferential direction, and the following are provided: an input member that inputs a torque to the inner magnet array, the outer magnet array or the magnetic body array; an output member that outputs a torque from the inner magnet array, the outer magnet array or the magnetic body array, an input rotation speed detection portion that detects a rotation speed of the input member; an output rotation speed detection portion that detects a rotation speed of the output member; and a control portion that controls an operation of the actuator based on the rotation speeds detected by the input rotation speed detection portion and the output rotation speed detection portion.

In the present disclosure, the control portion is capable of controlling the operation of the actuator based on the rotation speed of the input member that inputs a torque to the magnetic transmission and the rotation speed of the output member that outputs a torque. Consequently, the control portion is capable of automatically adjusting the positional relationship among the inner magnet array, the magnetic body array and the outer magnet array and realizing a required transmission gear ratio irrespective of the inputted torque and the condition of the load.

According to the present disclosure, the transmission gear ratio of the radial gap type magnetic transmission can be changed continuously.

The above and further objects and features will more fully be apparent from the following detailed description with accompanying drawings.

DETAILED DESCRIPTION

Hereinafter, the present disclosure will be described in detail based on the drawings showing embodiments thereof.

(First Embodiment)

Figure 1:
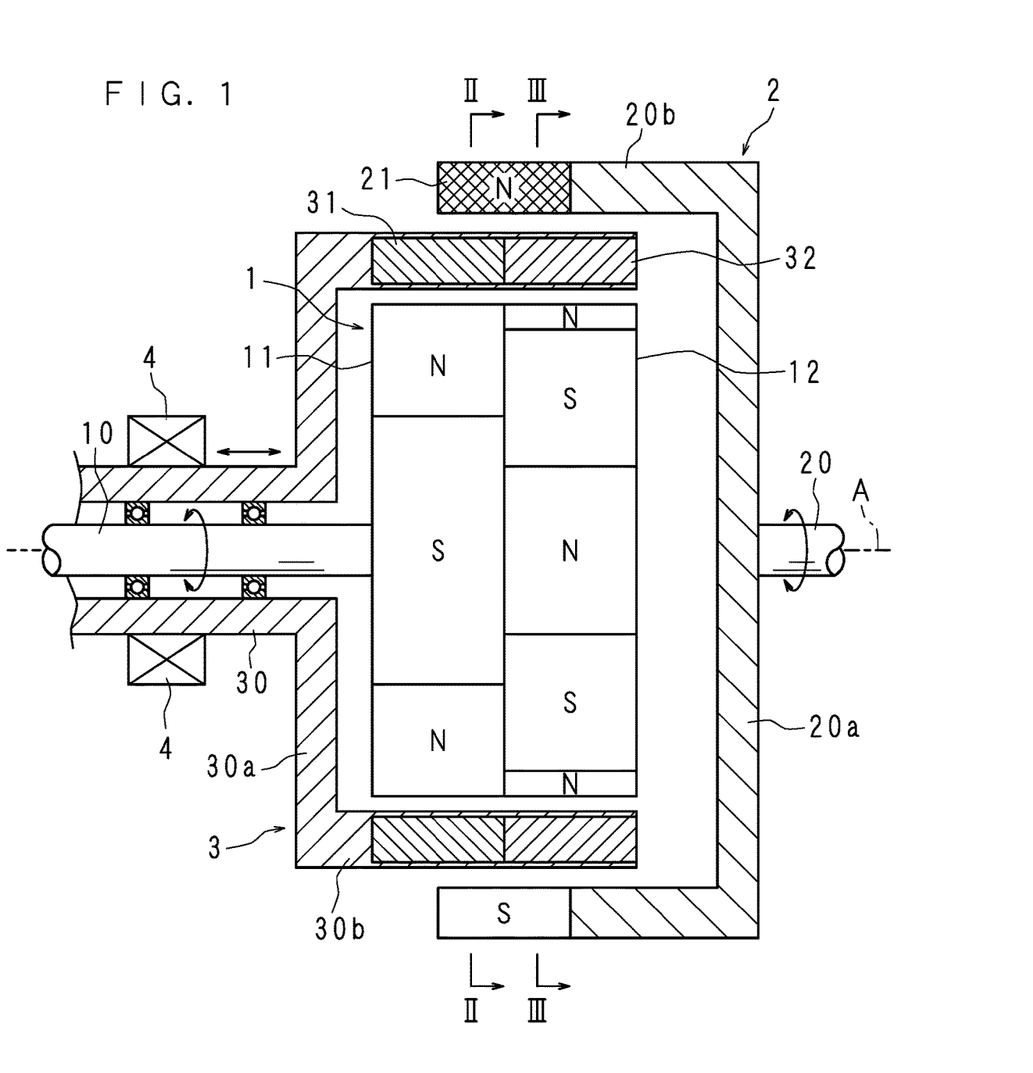
FIG. 1 A side cross-sectional view showing the structure of a magnetic transmission according to a first embodiment.
Figure 2:
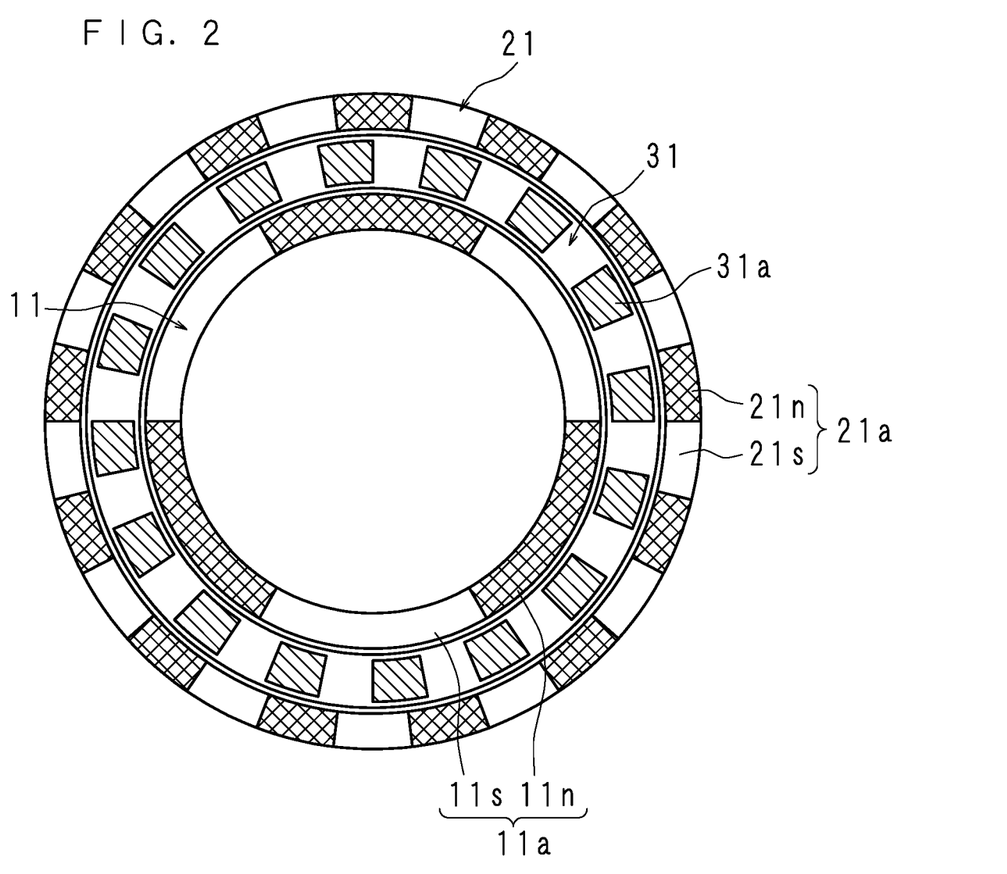
FIG. 2 A II-II cross-sectional view of the magnetic transmission.
Figure 3:
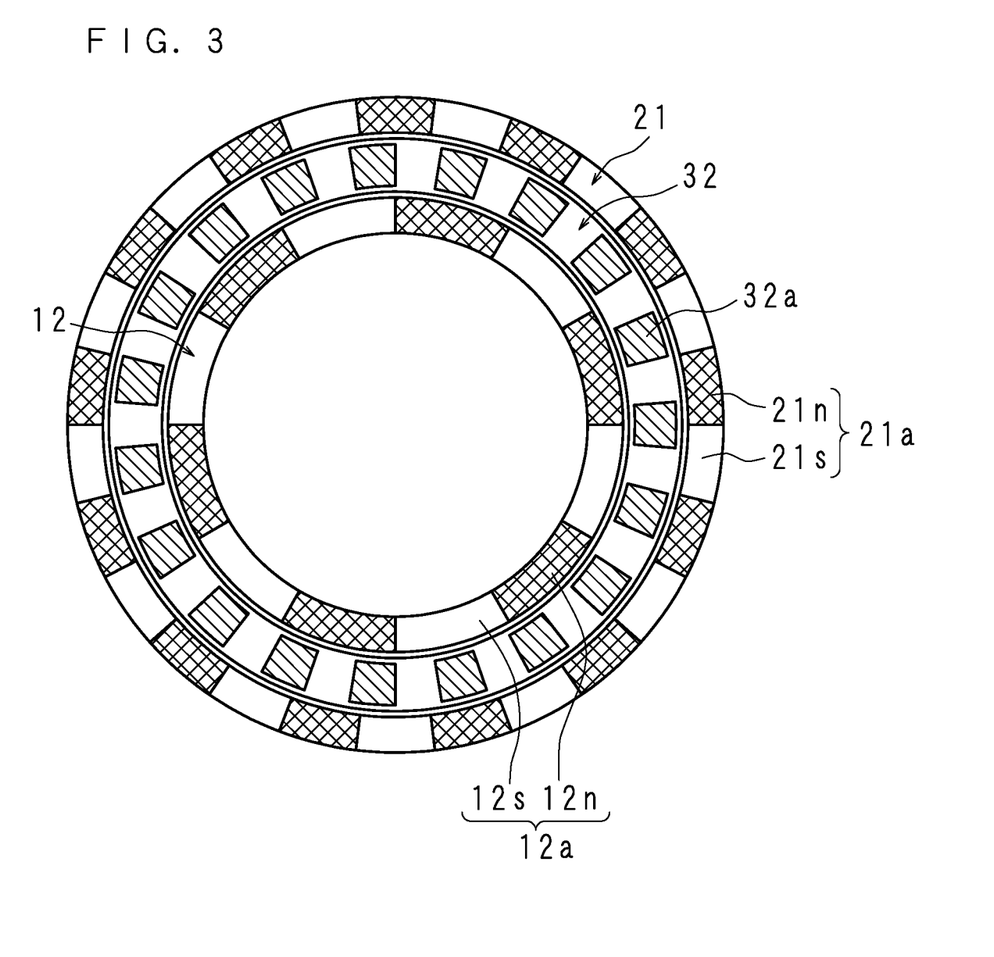
FIG. 3 A III-III cross-sectional view of the magnetic transmission.

FIG. 1 is a side cross-sectional view showing the structure of a magnetic transmission according to a first embodiment, FIG. 2 is a II-II cross-sectional view of the magnetic transmission, and FIG. 3 is a III-III cross-sectional view of the magnetic transmission. The magnetic transmission according to the first embodiment of the present disclosure is a radial gap type magnetic gear device that outputs the inputted torque after speed-changing it. The magnetic transmission is provided with: a coaxially disposed discoid inner rotor (inner magnet array) 1; an outer rotor (outer magnet array) 2; and a magnetic-field-modulating stator (magnetic body array) 3 disposed between the inner rotor 1 and the outer rotor 2. Moreover, the magnetic transmission is provided with: an input shaft (input member) 10 for inputting a torque to the magnetic transmission; and an output shaft (output member) 20 that outputs the speed-changed torque. The input shaft 10 and the output shaft 20 are made of a non-magnetic material such as aluminum or non-magnetic stainless steel. When the influence of the magnetic field generated by the magnet arrays is small, a magnetic body may be used.

The inner rotor 1 is provided on one end side of the input shaft 10, and when a torque is inputted to the input shaft 10, the inner rotor 1 rotates about the central axis A. The rotation axis direction of the input shaft 10 substantially coincides with the central axis A of the inner rotor 1.

A bearing is provided in an appropriate position of the input shaft 10, and a tubular portion 30 is coaxially disposed via the bearing on the outer periphery side of the input shaft 10. The tubular portion 30 is structured so as to be movable in the direction of the central axis A by an actuator 4 described later. The input shaft 10 moves following the axial movement of the tubular portion 30. An annular plate portion 30a is provided on an end portion of the tubular portion 30. A tubular magnetic body holding portion 30b that surrounds the outer side of the inner rotor 1 is provided on the outer peripheral portion of the annular plate portion 30a. The width of the magnetic body holding portion 30b in the direction of the central axis A is larger than the width of the inner rotor 1. The tubular portion 30, the annular plate portion 30a and the magnetic body holding portion 30b are made of a non-magnetic material such as aluminum or a non-magnetic stainless steel.

On one end side of the output shaft 20, a disc portion 20a is provided so that the central axis A substantially coincides, and a tubular outer magnet array holding portion 20b that surrounds the outer side of the magnetic-field-modulating stator 3 is provided on the outer peripheral portion of the disc portion 20a. The disc portion 20a and the outer magnet array holding portion 20b are made of a non-magnetic material such as aluminum or a non-magnetic stainless steel.

The outer magnet array holding portion 20b may extend so as to cover the outer periphery side of a magnet array 21.

In that case, the outer magnet array holding portion 20b may be made of a magnetic material. By making it of a magnetic material, the magnetic field generated by the magnet array 21 can be used efficiently.

In the present description, substantial coincidence means coincidence in design, and the expression, substantial coincidence, is used so that dimensional tolerance necessary for machining and the like and errors caused in the process of production are included. Moreover, coincidence in design does not necessarily mean complete coincidence but may include a case where the inner rotor 1, the outer rotor 2 and the magnetic-field-modulating stator 3 rotate while being magnetically linked together and the central axes disaccord within a range where the torque inputted to the input shaft 10 can be transmitted and outputted from the output shaft 20.

The inner rotor 1 is provided with: a first magnet array 11 where a plurality of magnetic pole pairs 11a are disposed at substantially equal intervals along the circumferential direction; and a second magnet array 12 where a plurality of magnetic pole pairs 12a are disposed at substantially equal intervals at different pitches from the first magnet array 11 along the circumferential direction. As shown in FIG. 2, the magnetic pole pairs 11a of the first magnet array 11 are formed of, for example, magnets 11n the outer periphery side of which is the N pole and magnets 11s the outer periphery side of which is the S pole which magnets are arc-shaped in cross section and polarized in the direction of the thickness. The magnets 11n and 11s are rare earth-transition metal magnets (for example, Nd—Fe—B magnets), bond magnets, ferrite magnets or the like. Likewise, as shown in FIG. 3, the magnetic pole pairs 12a of the second magnet array 12 are formed of, for example, magnets 12n the outer periphery side of which is the N pole and magnets 12s the outer periphery side of which is the S pole which magnets are arc-shaped in cross section and polarized in the direction of the thickness. The number of magnetic pole pairs 11a is, for example, three, and the number of magnetic pole pairs 12a is, for example, six. The first magnet array 11 and the second magnet array 12 are arranged in the direction of the central axis A. The first magnet array 11 and the second magnet array 12 are substantially the same in the width in the direction of the central axis A and the outer diameter. The first magnet array 11 and the second magnet array 12 are in contact in the direction of the central axis A. The inner rotor 1 has a discoid holding portion (not shown) that supports the inner periphery sides of the first magnet array 11 and the second magnet array 12 with the outer periphery side thereof, and is discoid as a whole. It is preferable that the discoid holding portion be formed of a magnetic body. The first magnet array 11 and the second magnet array 12 are fixed to each other in the circumferential direction, and the first magnet array 11 and the second magnet array 12 rotate integrally.

The magnetic-field-modulating stator 3 is provided with: a first magnetic body array 31 where a plurality of magnetic bodies 31a are disposed at substantially equal intervals along the circumferential direction; and a second magnetic body array 32 where a plurality of magnetic bodies 32a are disposed at substantially equal intervals at different pitches from the first magnetic body array 31 along the circumferential direction. The first magnetic body array 31 and the second magnetic body array 32 are held by the magnetic body holding portion 30b. The magnetic-field-modulating stator 3 modulates the spatial frequency of the magnetic field generated by the inner rotor 1, and the magnetic field in the circumferential direction of the first magnet array 11 and the second magnet array 12 are modulated by a magnetic field containing a frequency component different from the spatial frequency of the magnetic field by the magnetic-field-modulating stator 3. The number of magnetic bodies 31a is, for example, sixteen, and the number of magnetic bodies 32a is, for example, nineteen. As the magnetic bodies 31a and the magnetic bodies 32a, for example, soft magnetic bodies made of a magnetic metal, a laminated steel plate formed of a plurality of laminated magnetic plates, a green compact of magnetic powder or the like is used. In particular, as the material of the magnetic bodies 31a and 32a, a laminated steel plate is preferable since it can suppress the eddy-current loss.

In the direction of the central axis A, since the magnetic-field-modulating stator 3 is fixed with respect to the inner rotor 1, the opposing relationship is held between the first magnetic body array 31 and the second magnetic body array 32, and the first magnet array 11 and the second magnet array 12. In the radial direction, the first magnetic body array 31 opposes the first magnet array 11, and the second magnetic body array 32 opposes the second magnet array 12. The first magnetic body array 31 and the second magnetic body array 32 are arranged in the direction of the central axis A. The first magnetic body array 31 and the second magnetic body array 32 are substantially the same in the width in the direction of the central axis A and the width in the radial direction and are in contact in the direction of the central axis A, and the magnetic-field-modulating stator 3 is cylindrical as a whole. The first magnetic body array 31 and the second magnetic body array 32 are fixed to each other in the axial direction, and the first magnetic body array 31 and the second magnetic body array 32 move integrally.

The outer rotor 2 is provided with the magnet array 21 where a plurality of magnetic pole pairs 21a are disposed at substantially equal intervals along the circumferential direction, and the magnet array 21 is held by the outer magnet array holding portion 20b. The number of magnetic pole pairs 21a constituting the magnet array 21 is, for example, thirteen. As shown in FIG. 2 and FIG. 3, the magnetic pole pairs 21a are formed of, for example, magnets 21n the inner periphery side of which is the N pole and magnets 21s the inner periphery side of which is the S pole which magnets are arc-shaped in cross section and polarized in the direction of the thickness. The material of the magnets 21n and 21s is similar to that of the magnets 11n and 11s. The width of the magnet array 21 in the direction of the central axis A is substantially the same as those of the first magnet array 11 and the second magnet array 12. The pitches of the magnet array 21 are different from those of the first magnet array 11 and the second magnet array 12. In other words, the number of magnetic pole pairs 21a disposed in the circumferential direction is different from the numbers of magnetic pole pairs 11a and 12a disposed on the first magnet array 11 and the second magnet array 12.

Moreover, the magnetic transmission is provided with the actuator 4 that relatively moves the inner rotor 1 and the magnetic-field-modulating stator 3, and the outer rotor 2 in the direction of the central axis A by continuously moving the tubular portion 30 integrally with the inner rotor 1 in the direction of the central axis A. The actuator 4 is provided with, for example, a ball screw mechanism that moves the tubular portion 30 in the direction of the central axis A and a motor that drives the mechanism. Moreover, the actuator 4 may be a linear motor. By moving the tubular portion 30 by the actuator 4, the position where the inner rotor 1 and the outer rotor 2 oppose each other via the magnetic-field-modulating stator 3 can be changed continuously.

In the present description, equal intervals mean equal intervals in design, and the expression, substantially equal intervals, is used so that dimensional tolerance necessary for machining and the like and errors caused in the process of production are included. Moreover, equal intervals in design do not necessarily mean complete coincidence but may include a case where the inner rotor 1, the outer rotor 2 and the magnetic-field-modulating stator 3 rotate while being magnetically linked together and the central axes disaccord within a range where the torque inputted to the input shaft 10 can be transmitted and outputted from the output shaft 20.

The numbers of magnetic pole pairs 11a and 12a constituting the inner rotor 1, magnetic bodies 31a and 32a constituting the magnetic-field-modulating stator 3 and magnetic pole pairs 21a constituting the outer rotor 2 will be described.

The above-mentioned numbers of magnetic pole pairs 11a and 21a and the number of magnetic bodies 31a are an example, and are set as appropriate according to a desired gear ratio. However, a structure is preferable in which the numbers of magnetic pole pairs 11a of the first magnet array 11 associated with the inner rotor 1, magnetic bodies 31a of the first magnetic body array 31 associated with the magnetic-field-modulating stator 3 and magnetic pole pairs 21a of the outer rotor 2 satisfy the following expression (1) (Tetsuya IKEDA, Kenji NAKAMURA, and Osamu ICHINOKURA, "A Way to Improve Efficiency of Permanent-Magnet Magnetic Gears", Journal of the Magnetics Society of Japan, 2009, vol. 33, no. 2, pp. 130-134):

$$p2 = ns1\_1 \pm p1\_1 \quad (1)$$

Here,
$p1\_1$ is the number of magnetic pole pairs 11a,
$p2$ is the number of magnetic pole pairs 21a, and
$ns1\_1$ is the number of magnetic bodies 31a.

The present embodiment where $p1\_1=3$, $p2=13$ and $ns1\_1=16$ satisfies the above expression (1).

Likewise, a structure is preferable in which the numbers of magnetic pole pairs 12a of the second magnet array 12 associated with the outer rotor 2, magnetic bodies 32a of the second magnetic body array 32 associated with the magnetic-field-modulating stator 3 and magnetic pole pairs 21a associated with the outer rotor 2 satisfy the following expression (2):

$$p2 = ns1\_2 \pm p1\_2 \quad (2)$$

Here,
$p1\_2$ is the number of magnetic pole pairs 12a,
$p2$ is the number of magnetic pole pairs 21a, and
$ns1\_2$ is the number of magnetic bodies 32a.

The present embodiment where $p1\_2=6$, $p2=13$ and $ns1\_2=19$ satisfies the above expression (2).

Figure 4A:
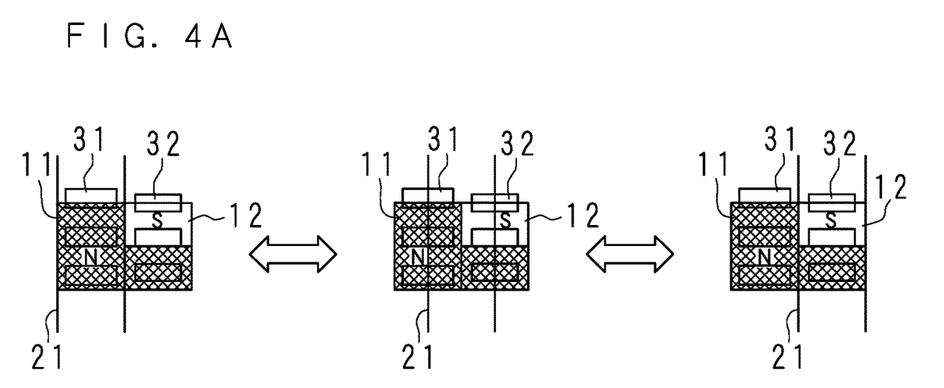
FIG. 4A An explanatory view showing the operation of the magnetic transmission.
Figure 4B:
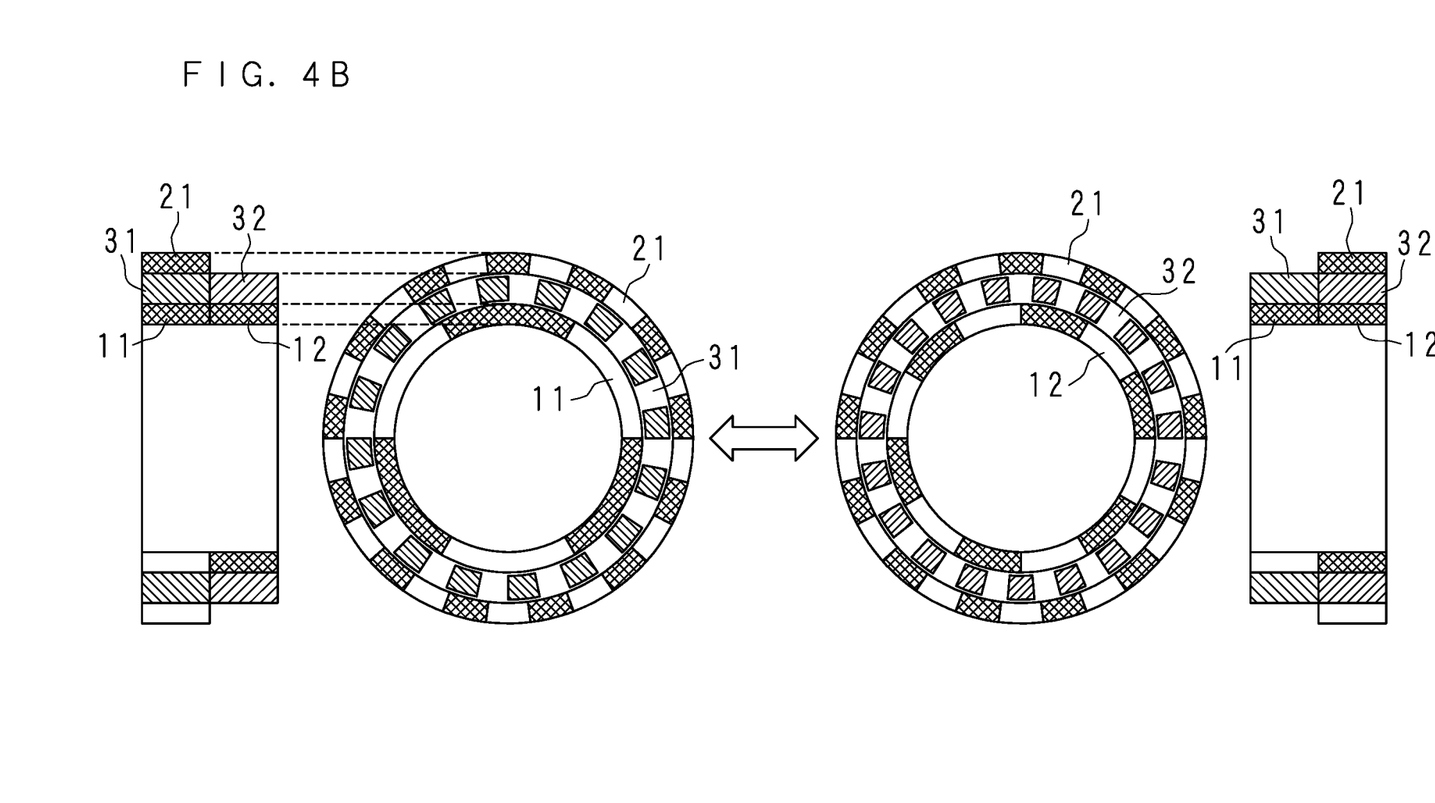
FIG. 4B An explanatory view showing the operation of the magnetic transmission.

FIG. 4A and FIG. 4B are explanatory views showing the operation of the magnetic transmission. FIG. 4A is top views of the magnetic transmission showing the positional relationship between the inner rotor 1 and the outer rotor 2 that is changed by the actuator 4, and FIG. 4B is side cross-sectional views and axial cross-sectional views of the magnetic transmission. The left views of FIG. 4A and FIG. 4B show a condition where the magnet array 21 of the outer rotor 2 is opposed to the first magnet array 11. With respect to the magnet array 21 of the outer rotor 2, only the width is indicated by two lines.

When the inner rotor 1, the outer rotor 2 and the magnetic-field-modulating stator 3 satisfy the above expression (1), particularly, $p2=ns1\_1-p1\_1$, the transmission gear ratio of the magnetic transmission, that is, the ratio between the rotation speeds of the input shaft 10 and the output shaft 20 is expressed by the following (3):

$$\omega 1/\omega 0 = -p1\_1/(ns1\_1-p1\_1) \quad (3)$$

Here,
$\omega 0$ is the rotation speed of the input shaft 10, and
$\omega 1$ is the rotation speed of the output shaft 20.

When $p1\_1=3$ and $ns1\_1=16$, the transmission gear ratio $\omega 1/\omega \approx -1/4$, so that the input shaft 10 and the output shaft 20 rotate in the opposite direction at a transmission gear ratio of approximately 1/4.

The right views of FIGS. 4A and 4B show a condition where the magnet array 21 of the outer rotor 2 is opposed to the second magnet array 12. When the inner rotor 1, the outer rotor 2 and the magnetic-field-modulating stator 3 satisfy the above expression (2), particularly, $p2=ns1\_2-p1\_2$, the transmission gear ratio of the magnetic transmission is expressed by the following expression (4):

$$\omega 1/\omega 0 = -p1\_2/(ns1\_2-p1\_2) \quad (4)$$

When $p1\_2=6$ and $ns1\_2=19$, the transmission gear ratio $\omega 1/\omega 0 \approx -1/2$, so that the input shaft 10 and the output shaft 20 rotate in the opposite direction at a transmission gear ratio of approximately 1/2.

The central view of FIG. 4A shows a condition where the magnet array 21 of the outer rotor 2 is opposed to both the first magnet array 11 and the second magnet array 12. In this case, the transmission gear ratio is a value between 1/4 and 1/2. When the magnet array 21 of the outer rotor 2 is opposed to both the first magnet array 11 and the second magnet array 12, although the transmission gear ratio does not match and a malfunction seems to occur, a transmission gear ratio of higher than 1/4 and less than 1/2 is obtained.

In the magnetic transmission according to the present embodiment structured as described above, the transmission gear ratio of the radial gap type magnetic transmission can be changed continuously.

Moreover, by making the first magnet array 11 and the second magnet array 12 constituting the inner rotor 1 in contact in the direction of the central axis A, the transmission gear ratio can be changed more smoothly.

Further, by making the first magnetic body array 31 and the second magnetic body array 32 constituting the magnetic-field-modulating stator 3 in contact in the direction of the central axis A, the transmission gear ratio can be more smoothly changed.

Furthermore, according to the structure of the present disclosure, by opposing the outer rotor 2 to both the first magnet array 11 and the second magnet array 12, cogging torque can be reduced.

(Second Embodiment)

Figure 5:
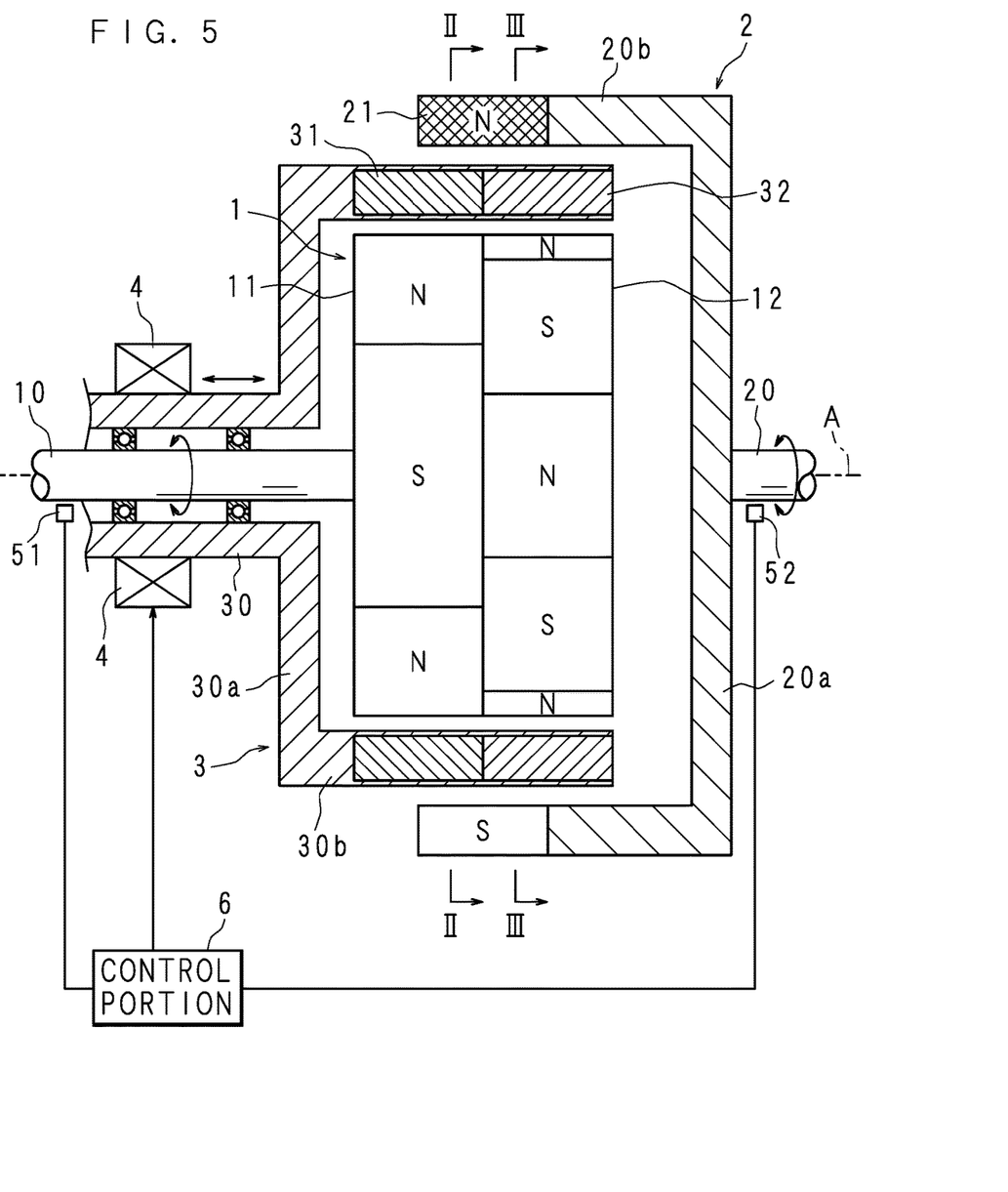
FIG. 5 A side cross-sectional view showing the structure of a magnetic transmission according to a second embodiment.

FIG. 5 is a side cross-sectional view showing the structure of a magnetic transmission according to a second embodiment. The magnetic transmission according to the second embodiment is provided with the inner rotor 1, the outer rotor 2 and the magnetic-field-modulating stator 3 similar to those of the first embodiment, and is further provided with: an input rotation speed detection portion 51 that detects the rotation speed of the input shaft 10; an output rotation speed detection portion 52 that detects the rotation speed of the output shaft 20; and a control portion 6 that controls the operation of the actuator 4 based on the detected rotation speed.

The input rotation speed detection portion 51 is provided with, for example: a magnetic pickup transmitting a signal proportional to the number of rotations of the input shaft 10; a non-contact sensor having a Hall element and the like; and a counting circuit counting the number of pulses from the non-contact sensor, and calculates the rotation speed of the input shaft 10 by counting the number of pulses. The input rotation speed detection portion 51 outputs to the control portion 6 a rotation speed signal representative of the rotation speed obtained by performing the detection.

The output rotation speed detection portion 52 which has a similar structure to the input rotation speed detection portion 51 detects the rotation speed of the output shaft 20 and outputs to the control portion 6 a rotation speed signal obtained by performing the detection.

The control portion 6 is, for example, a microcomputer having one or more than one CPU (central processing unit), a multi-core CPU, a ROM (read only memory), a RAM (random access memory), an input-output interface and the like. The CPU of the control portion 6 is connected to the input rotation speed detection portion 51, the output rotation speed detection portion 52 and the actuator 4 via the input-output interface. The control portion 6 obtains the rotation speed signals outputted from the input rotation speed detection portion 51 and the output rotation speed detection portion 52. Then, based on the obtained rotation speed signals, the control portion 6 calculates the ratio between the rotation speed of the input shaft 10 and the rotation speed of the output shaft 20, and compares the ratio obtained by performing the calculation with a required transmission gear ratio. The control portion 6 controls the operation of the actuator 4 so that the inner rotor 1 and the magnetic-field-modulating stator 3 move in a direction that decreases the difference between the ratio obtained by performing the calculation and the required transmission gear ratio.

For example, when the target transmission gear ratio is 1/3 and the calculated actual transmission gear ratio is higher than 1/3, the control portion 6 moves the inner rotor 1 and the magnetic-field-modulating stator 3 in a direction that increases the opposing area of the first magnet array 11 and the magnet array 21 (rightward in FIG. 5). When the calculated actual transmission gear ratio is lower than 1/3, the control portion 6 moves the inner rotor 1 and the magnetic-field-modulating stator 3 in a direction that increases the opposing area of the second magnet array 12 and the magnet array 21 (leftward in FIG. 5).

In the magnetic transmission according to the present embodiment structured as described above, a required transmission gear ratio can be obtained by automatically adjusting the positions of the inner rotor 1 and the magnetic-field-modulating stator 3 according to the input torque and the magnitude of a non-illustrated load provided on the output shaft 20.

While a structure in which the inner rotor has the first magnet array and the second magnet array is described in the first and second embodiments, a structure may be adopted in which the outer rotor has the first magnet array and the second magnet array and the outer rotor and the magnetic-field-modulating stator are integrally moved by the actuator.

Moreover, while a structure is described in which the inner magnet array and the outer magnet array where a plurality of magnetic pole pairs are disposed at substantially equal intervals along the circumferential direction are rotated as the inner rotor and the outer rotor and the magnetic body array where a plurality of magnetic bodies are disposed along the circumferential direction is made the magnetic-field-modulating stator, any of the inner magnet array, the outer magnet array and the magnetic body array may be made the stator.

Further, while a structure is described in which the first magnet array 11 and the second magnet array 12 constituting the inner rotor 1 are made in contact in the direction of the central axis A, if there is no problem with the continuous change of the transmission gear ratio, the first magnet array 11 and the second magnet array 12 may be separated from each other.

Furthermore, while a structure is described in which the first magnetic body array 31 and the second magnetic body array 32 constituting the magnetic-field-modulating stator 3 are made in contact in the direction of the central axis A, if there is no problem with the continuous change of the transmission gear ratio, the first magnetic body array 31 and the second magnetic body array 32 may be separated from each other.

Furthermore, while a structure having the electric actuator 4 is described in the first and second embodiments, a structure having a manual actuator such as a ball screw mechanism may be adopted. Moreover, an actuator is not necessarily provided when the structure is such that the inner rotor 1, the outer rotor 2 and the magnetic-field-modulating stator 3 can be moved relatively.

It is to be noted that, as used herein and in the appended claims, the singular forms "a", "an", and "the" include plural referents unless the context clearly dictates otherwise.

The embodiments disclosed above are to be regarded as exemplary at all points and as not restrictive. The scope of the present invention is defined by the scope of the claims rather than the above-described meaning and is intended to include all changes within the scope of the claims and the scope or the meaning equivalent thereto.

The invention claimed is:

1. A magnetic transmission comprising: an inner magnet array where a plurality of magnetic pole pairs are disposed at substantially equal intervals along a circumferential direction; an outer magnet array where a plurality of magnetic pole pairs are disposed along the circumferential direction coaxially with the inner magnet array at different pitches from the magnetic pole pairs of the inner magnet array; and a magnetic body array coaxially disposed between the inner magnet array and the outer magnet array and where a plurality of magnetic bodies are disposed along the circumferential direction,
    wherein the inner magnet array or the outer magnet array is provided with
    a first magnet array and a second magnet array arranged in a direction of a central axis and disposed at different pitches in the circumferential direction,
    the magnetic body array is provided with
    a first magnetic body array and a second magnetic body array opposing the first magnet array and the second magnet array in a radial direction, respectively, and disposed at different pitches in the circumferential direction, and
    the inner magnet array, the outer magnet array and the magnetic body array are relatively and continuously movable in the direction of the central axis while an opposing relationship is held between the first magnetic body array and the second magnetic body array, and the first magnet array and the second magnet array.

2. The magnetic transmission according to claim 1,
    wherein the first magnet array and the second magnet array are in contact in the direction of the central axis.

3. The magnetic transmission according to claim 1,
wherein the first magnetic body array and the second magnetic body array are in contact in the direction of the central axis.

4. The magnetic transmission according to claim 1, comprising
an actuator that relatively and continuously moves the inner magnet array, the outer magnet array and the magnetic body array in the direction of the central axis while the opposing relationship is held between the first magnetic body array and the second magnetic body array, and the first magnet array and the second magnet array.

5. The magnetic transmission according to claim 4,
wherein any two of the inner magnet array, the outer magnet array and the magnetic body array are rotatable in the circumferential direction, and
the following are provided: an input member that inputs a torque to the inner magnet array, the outer magnet array or the magnetic body array;
an output member that outputs a torque from the inner magnet array, the outer magnet array or the magnetic body array,
an input rotation speed detection portion that detects a rotation speed of the input member;
an output rotation speed detection portion that detects a rotation speed of the output member; and
a control portion that controls an operation of the actuator based on the rotation speeds detected by the input rotation speed detection portion and the output rotation speed detection portion.

* * * * *